(12) United States Patent
Chen et al.

(10) Patent No.: US 10,248,559 B2
(45) Date of Patent: Apr. 2, 2019

(54) WEIGHTING-TYPE DATA RELOCATION CONTROL DEVICE AND METHOD

(71) Applicant: REALTEK SEMICONDUCTOR CORPORATION, Hsinchu (TW)

(72) Inventors: Yen-Chung Chen, Hsinchu County (TW); Chih-Ching Chien, Hsinchu County (TW); Fu-Hsin Chen, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 279 days.

(21) Appl. No.: 15/297,590

(22) Filed: Oct. 19, 2016

(65) Prior Publication Data
US 2017/0199813 A1 Jul. 13, 2017

(30) Foreign Application Priority Data
Jan. 12, 2016 (TW) .................................. 105100758

(51) Int. Cl.
*G06F 11/00* (2006.01)
*G06F 12/02* (2006.01)
(52) U.S. Cl.
CPC .......... *G06F 12/0246* (2013.01); *G06F 11/00* (2013.01); *G06F 12/0253* (2013.01); *G06F 2212/7201* (2013.01); *G06F 2212/7205* (2013.01); *G06F 2212/7211* (2013.01)

(58) Field of Classification Search
CPC ............ G06F 12/0246; G06F 12/0253; G06F 2212/7201; G06F 2212/7205; G06F 2212/7211; G06F 11/00
See application file for complete search history.

(56) References Cited

U.S. PATENT DOCUMENTS

| | | | | |
|---|---|---|---|---|
| 2011/0302477 A1* | 12/2011 | Goss | ................... | G06F 11/1068 714/773 |
| 2014/0181432 A1* | 6/2014 | Horn | ................... | G06F 12/0253 711/159 |
| 2015/0052415 A1* | 2/2015 | Um | ..................... | G06F 11/1056 714/768 |
| 2016/0162219 A1* | 6/2016 | Erez | ..................... | G06F 3/0653 711/103 |
| 2016/0267004 A1* | 9/2016 | Perlstein | ............. | G06F 12/0246 |

* cited by examiner

*Primary Examiner* — Hashem Farrokh
*Assistant Examiner* — Jane Wei
(74) *Attorney, Agent, or Firm* — WPAT, PC (57) ABSTRACT

The present disclosure provides a weighting-type data relocation control device for controlling data relocation of a non-volatile memory which includes used blocks and unused blocks. Each used block is associated with a first parameter and a second parameter. The control device executes the following steps: multiplying the first and second parameters by a first and a second weightings respectively to obtain a priority index, in which at least one of the parameters and/or at least one of the weightings relate(s) to a thermal detection result; comparing the priority index with at least a threshold to obtain a comparison result; and if the comparison result corresponding to a used storage block of the used blocks reaches a predetermined threshold, transferring valid data of the used storage block to one of the unused blocks.

20 Claims, 5 Drawing Sheets

WEIGHTING-TYPE DATA RELOCATION CONTROL DEVICE AND METHOD

BACKGROUND OF THE INVENTION

1. Field of the Invention

The present disclosure relates to storage control, especially to a weighting-type data relocation control device and method.

2. Description of Related Art

A general non-volatile memory (e.g., flash memory) controller (e.g., solid state drive (SSD) controller) detects whether data should be relocated according to several kinds of data relocation decision rules, so as to use storage space efficiently and prevent data from corruption to ensure the correctness of data. The several kinds of data relocation decision rules usually include a garbage collection rule, a data retention rule, a wear leveling rule, etc. The garbage collection rule is for the controller to select a used storage block with less valid data and transfer the valid data of said used storage block to an unused storage block, so that the used storage block is safe to be erased for reuse. The data retention rule is for the controller to transfer valid data of a used storage block to an unused storage block before the valid data of said used storage block become corrupted and unable to be read correctly, so that the time of data retention is extended.

A conventional non-volatile memory controller usually transfers data by a single rule at a time rather than by taking multiple rules into consideration at a time, and thus such controller and the data relocation techniques it takes lead to the performance waste and the reduction in the service life of a non-volatile memory using this kind of controller.

SUMMARY OF THE INVENTION

In consideration of the problems of the related art, an object of the present disclosure is to provide a weighting-type data relocation control device and method for making an improvement over the related art.

The present disclosure discloses a weighting-type data relocation control device, configured to control data relocation of a non-volatile memory, in which the non-volatile memory includes used blocks and unused blocks, and each of the used blocks is associated with a first relocation parameter and a second relocation parameter. An embodiment of the weighting-type data relocation control device includes a storage controller, and the storage controller is configured to carry out at least the following steps for controlling data relocation of the above-mentioned non-volatile memory: multiplying the first relocation parameter and the second relocation parameter by a first weighting and a second weighting respectively and thereby obtaining a relocation priority index, in which at least one of said first and second relocation parameters and/or at least one of said first and second weightings relate(s) to a thermal detection result; comparing the relocation priority index with at least one threshold and thereby obtaining a comparison result; and if the comparison result corresponding to a used storage block of the used blocks indicates that the used storage block reaches a predetermined relocation threshold, transferring valid data of the used storage block to an unused storage block of the unused blocks.

The present disclosure further discloses a weighting-type data relocation control method executed by the weighting-type data relocation control device or the equivalent thereof. This method can control data relocation of a non-volatile memory, in which the non-volatile memory includes used blocks and unused blocks, and each of the used blocks is associated with a first relocation parameter and a second relocation parameter. An embodiment of the method includes the following steps: multiplying the first relocation parameter and the second relocation parameter by a first weighting and a second weighting respectively and thereby obtaining a relocation priority index, in which at least one of said first and second relocation parameters and/or at least one of said first and second weightings relate(s) to a thermal detection result; comparing the relocation priority index with at least one threshold and thereby obtaining a comparison result; and if the comparison result corresponding to a used storage block of the used blocks indicates that the used storage block reaches a predetermined relocation threshold, transferring valid data of the used storage block to an unused storage block of the unused blocks.

These and other objectives of the present disclosure no doubt become obvious to those of ordinary skill in the art after reading the following detailed description of the exemplary embodiments that are illustrated in the various figures and drawings.

DETAILED DESCRIPTION OF THE EXEMPLARY EMBODIMENTS

The following description is written by referring to terms acknowledged in this industrial field. If any term is defined in this specification, such term should be explained accordingly.

The present disclosure includes a weighting-type data relocation control device and method applicable to a storage control device such as a solid state drive (SSD) controller or a device operable to control the access of a non-volatile memory (e.g., flash memory). On account of that some elements of the weighting-type data relocation device could be known, the detail of such elements will be omitted provided that this omission has little to do with the written description and enablement requirements. In addition, the method of the present disclosure can be in the form of firmware and/or software which could be carried out by the device of the present disclosure or the equivalent thereof.

In light of related background knowledge and/or the present disclosure, people of ordinary skill in the art can appreciate a general non-volatile memory storage mechanism (e.g., storing data in order according to a logic sequence of data blocks), a cause of invalid data generation (e.g., outdated data labeled as invalid data rather than overwritten by new data which is in place of the outdated data and stored elsewhere), an estimation of a number of valid data (e.g., accumulating an invalid data number or decreasing a valid data number progressively through a counter), an estimation of storage time (e.g., estimating storage time of several pieces of data according to the storage sequence of these pieces of data), etc. Therefore, the detail of such known arts and general knowledge is omitted without dissatisfying the written description and enablement requirements.

Figure 1A:
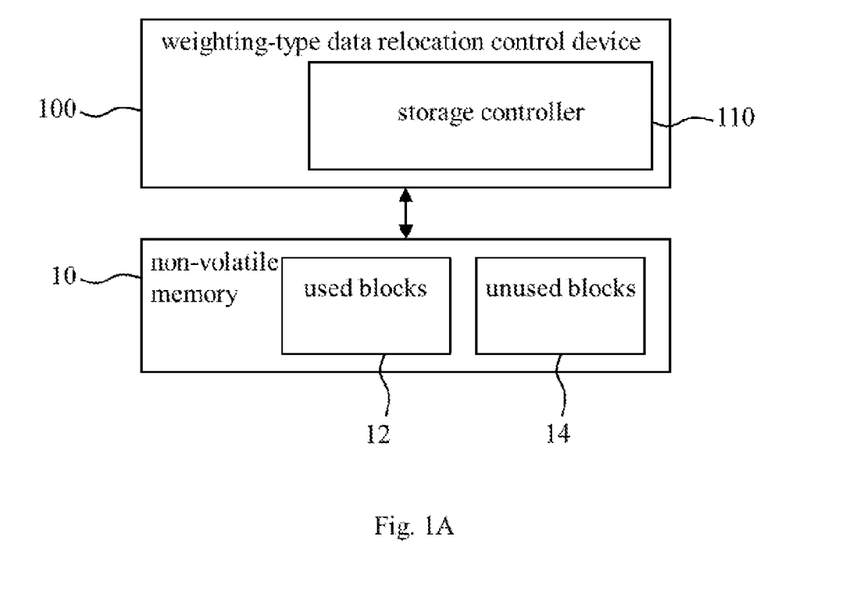
FIG. 1A illustrates an embodiment of the weighting-type data relocation control device of the present disclosure.

Referring to FIG. 1A, FIG. 1A illustrates a weighting-type data relocation control device according to an embodiment of the present disclosure. The weighting-type data relocation control device 100 of FIG. 1A is configured to control data relocation of a non-volatile memory 10. The memory 10 can be included in the control device 100 or independent of it, and includes a plurality of used blocks 12 and a plurality of unused blocks 14. Each of the used blocks 12 is associated with a plurality of relocation parameters. These relocation parameters include a first relocation parameter and a second relocation parameter. For the convenience of understanding, in the following description, the first and second relocation parameters are a count of invalid data and a ranking of storage time respectively. However, such example of the first and second relocation parameters is not a limitation to the scope of the present disclosure.

In some embodiments, if the storage time is longer (i.e., the time point of storage is earlier), the ranking of storage time is higher.

In some embodiments, the first and second relocation parameters represent a count of valid data and a ranking of storage time respectively, in which the longer the storage time, the lower the ranking of storage time.

In some embodiments, the control device 100 includes a storage controller 110 which can be realized by a general memory controller with a calculator (e.g., a multiplier or the equivalent thereof, an adder or the equivalent thereof, and a comparator or the equivalent thereof). The calculator can be included in or independent of the memory controller. The storage controller 110 is configured to carry out at least the steps in FIG. 1B for controlling the data relocation of the memory 10.

Figure 1B:
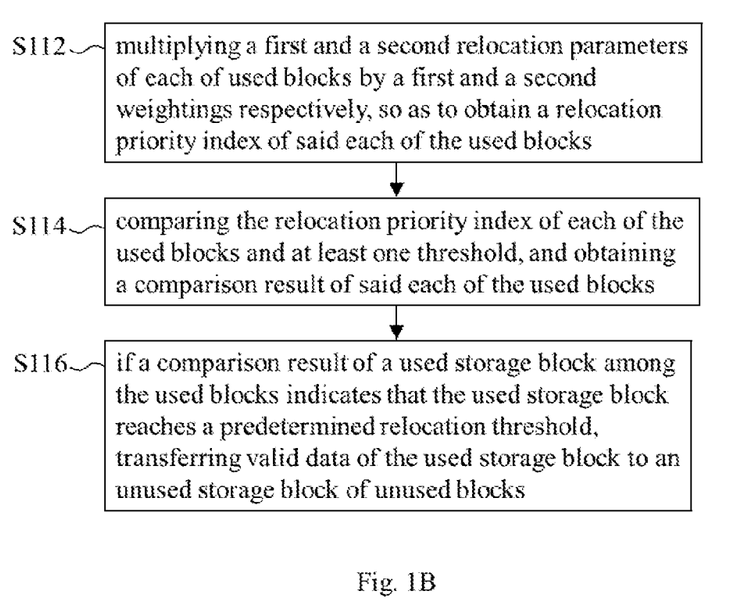
FIG. 1B illustrates an embodiment of the steps carried out by the storage controller of FIG. 1A.

In FIG. 1B, step S112 multiplies the first and second relocation parameters of each of the used blocks 12 by a first weighting and a second weighting respectively, so as to obtain a relocation priority index of said each of the used blocks 12. The generation and storage of the first and second relocation parameters are already known or can be self-developed, which is not the feature of the current embodiment. Therefore, the related detail is omitted.

In an embodiment, in consideration of that the effective shelf life of data is reduced due to the decrease of the remaining service life of the memory 10, which implies that the transfer of data in accordance with the storage time of said data requires more attention as time goes on, the storage controller 110 adjusts the first and second weightings according to an estimated service life of the memory 10. In other words, the storage controller 100 is operable to reduce the first weighting and raise the second weighting in response to the decrease of the estimated service life of the memory 10, in which the storage controller 110 may measure the estimated service life of the non-volatile memory 10 according to an erase number (e.g., a number of times that the memory 10 has been erased) or the error rate of data (e.g., correction rate of correcting data according to error correction code (ECC) when reading said data). Generally, the decrease of the erase number or the increase of the correction rate indicates the decrease of the estimated service life of the memory 10.

In an embodiment, step S112 includes the following sub-steps to increase the generation flexibility of the relocation priority index of each of the used blocks 12: multi-plying the first relocation parameter of said each of the used blocks 12 by the first weighting to obtain a first reference value; multiplying the second relocation parameter of said each of the used blocks 12 by the second weighting to obtain a second reference value; and summing the first and second reference values up to obtain the relocation priority index of said each of the used blocks 12, or summing the first and second reference values up in accordance with a weighted manner to obtain the relocation priority index of said each of the used blocks 12. In an embodiment, step S112 is carried out by a multiplier or the equivalent thereof and carried out by an adder or the equivalent thereof.

In FIG. 1B, the relocation priority index of each of the used blocks 12 is compared with at least one threshold, and thereby a comparison result of said each of the used blocks 12 is obtained. The at least one threshold is chosen by those implementing this embodiment in accordance with their demand.

In an embodiment, the at least one threshold is configured to vary with the estimated service life of the memory 10. For example, the at least one threshold is lowered down as the estimated service life of the memory 10 decreases.

In an embodiment, step S114 is carried out by a comparator of the equivalent thereof.

In FIG. 1B, if a comparison result of a used storage block of the used blocks 12 indicates that the used storage block reaches a predetermined relocation threshold, valid data of the used storage block is transferred to an unused storage block of the unused blocks 14 in step S116. In this embodiment, if the comparison result indicates that the relocation priority index of the used storage block reaches the aforementioned at least one threshold, the used storage block is found reaching the predetermined relocation threshold. Meanwhile, the storage controller 110 is allowed to transfer the valid data of the used storage block to the unused storage block.

In an embodiment, step S116 is carried out by a general memory controller.

On the basis of the above description, in an exemplary implementation of the embodiment of FIG. 1A in view of FIG. 1B, the memory 10 is in the early stage of its whole service life; the first and second relocation parameters are a count of invalid data and a ranking of storage time respectively, and associated with a garbage collection rule and a data retention rule respectively; the maximum values of the first and second relocation parameters are 25 and 100 respectively; the first and second relocation parameters of a first used block among the used blocks 12 are 5 and 30 respectively; the first and second relocation parameters of a second used block among the used blocks 12 are 10 and 25 respectively; the first and second weightings are $0.6\times(100/25)=2.4$ and 0.4 respectively, in which the operation "$\times(100/25)$" is for balancing the difference between the first and second relocation parameters and is an optional operation which can be omitted. The at least one threshold includes a relocation value 25. Under the above-mentioned setting, the storage controller 110 first carries out step S112 to calculate the relocation priority index $(5\times2.4+30\times0.4)=24$ of the first used block and calculate the relocation priority index $(10\times2.4+25\times0.4)=34$ of the second used block. Then, the storage controller 110 carries out step S114 to determine that the comparison result of the first used block conforms to a first kind of results (i.e., the comparison result 24<25 conforms to a result that the relocation priority index is smaller than the relocation value), and the comparison result of the second used block conforms to a second kind of results (i.e., the comparison result 34>25 conforms to a result that the relocation priority index is greater than or equal to the relocation value). Afterwards, the storage controller 110 carries out step S116 to transfer valid data of the second used block reaching the predetermined relocation threshold to an unused storage block of the unused blocks 14. Compared to this embodiment, a conventional art may transfer valid data of the first used block in consideration of the issue of data retention under a presumed worst case; however, since the memory 10 is still in the early stage of its whole service life, the issue of data retention is not the first priority yet, so such conventional art transfers the valid data of the first used block prematurely, which leads to the waste of performance and the decrease of the available erase times.

In another exemplary implementation of the embodiment of FIG. 1A in view of FIG. 1B, the memory 10 is in the late stage of its whole service life, the first and second weightings are 0.1×(100/25)=0.4 and 0.9 respectively, and the other setting is the same as that of the preceding exemplary implementation. Under such setting with the higher second weighting 0.9, the storage controller 110 firstly carries out step S112 to calculate the relocation priority index (5×0.4+30×0.9)=29 of the first used block and calculate the relocation priority index (10×0.4+25×0.9)=26.5 of the second used block; then the storage controller 110 carries out step S114 to determine that both the comparison results of the first and second used blocks conform to the second kind of results (i.e., both the comparison results 29≥25 and 26.5≥25 conform to the result that the relocation priority index is greater than or equal to the relocation value). Afterwards, the storage controller 110 carries out step S116 to transfer valid data of the first and second used blocks reaching the predetermined relocation threshold to two of the unused blocks 14 respectively, so as to transfer data in time to prevent data loss. People who implement the current embodiment may adopt constant first and second weightings in consideration of the worst case or a self-defined scenario.

Referring to FIG. 1A and step S114 of FIG. 1B, in an embodiment, the at least one threshold includes a first threshold and a second threshold; if the relocation priority index of one of the used blocks 12 reaches the first threshold, the storage controller 110 assigns such used block 12 a first relocation priority; if the relocation priority index of one of the used blocks 12 is between the first threshold and the second threshold, the storage controller 110 assigns such used block 12 a second relocation priority, in which the second relocation priority is lower than the first relocation priority; and if the relocation priority index of one of the used blocks 12 fails to reach the second threshold, the storage controller 110 assigns such used block 12 a third relocation priority, in which the third relocation priority is lower than the second relocation priority. Through the above-mentioned manner, the storage controller 110 is capable of grouping the used blocks 12 according to their relocation priority indexes, so as to relocate the group of higher relocation priority preferentially. It should be noted that those of ordinary skill in the art may group the used blocks 12 into more groups by more thresholds in light of the teaching and suggestion of the above description.

Referring to FIG. 1A and step S116 of FIG. 1B, in an embodiment, after the storage controller 110 transferred the valid data of the used storage block, the storage controller 110 further executes the following steps: erasing the valid data of the used storage block to make it usable; and treating the unused storage block as a new used block. Each of the erasing operation and recycling operation is known in this industrial field, and therefore the related detail is omitted.

Figure 1C:
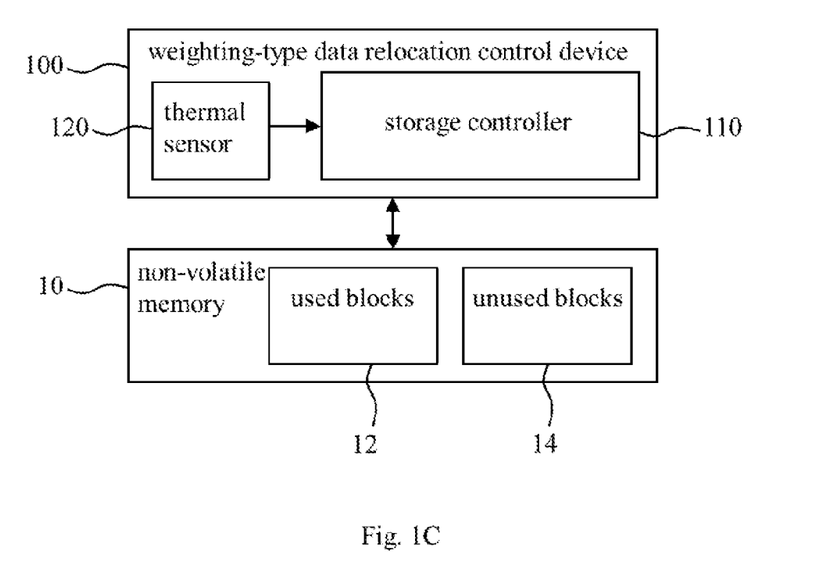
FIG. 1C illustrates another embodiment of the weighting-type data relocation control device of the present disclosure.
Figure 1D:
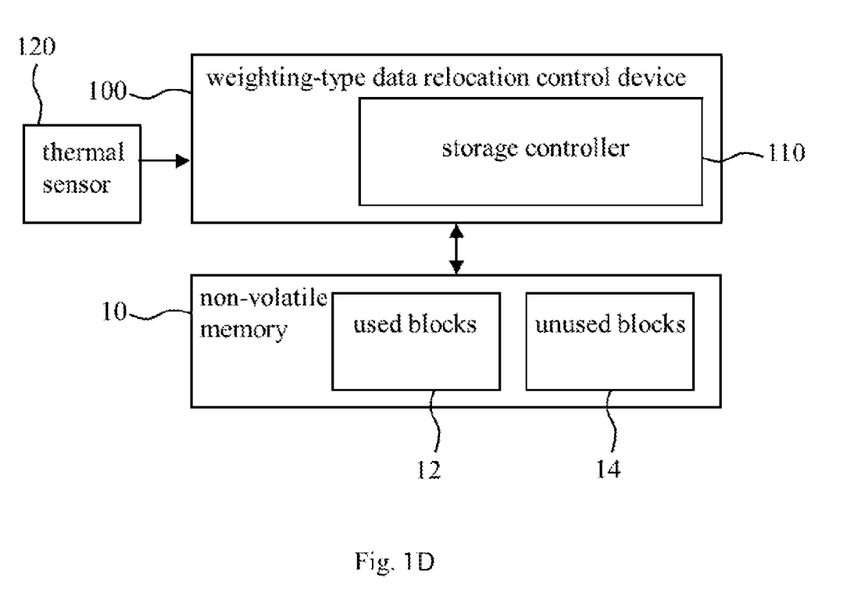
FIG. 1D illustrates a further embodiment of the weighting-type data relocation control device of the present disclosure.

At least one of the aforementioned first and second relocation parameters and/or at least one of the aforementioned first and second weightings is/are dependent upon an environmental factor. For instance, said environmental factor is the temperature of the place where the weighting-type data relocation control device 100 is positioned; when the environmental temperature gets higher, the data retention of the memory 10 gets harder (i.e., the data loss of the memory 10 gets easier), and thus the control device 100 sets at least one of the first and second relocation parameters and/or at least one of the first and second weightings according to a thermal detection result of a thermal sensor 120, in which the thermal sensor 120 could be included in the control device 100 as shown in FIG. 1C, or could be outside the control device 100 in another embodiment as shown in FIG. 1D. Referring to FIG. 1C or FIG. 1D, the thermal sensor 120 detects the temperature of the place where the control device 100 stays, and generates the aforementioned thermal detection result accordingly. The thermal detection result is digital information or analog information, and when it is in the form of analog information, the control device 100 uses a known analog-to-digital converter to convert the analog information into digital information. After obtaining the thermal detection result, in one embodiment, the storage controller 110 of the control device 100 selects appropriate parameter(s) as at least one of the first and second relocation parameters and/or selects appropriate weighting(s) as at least one of the first and second weightings through a look-up table or the equivalent thereof. In another embodiment, the storage controller 110 adjusts at least one of the current first and second relocation parameters and/or at least one of the current first and second weightings through a calculation operation (e.g., at least one of the four fundamental operations of arithmetic). In a further embodiment, the storage controller 110 keeps the current first and second relocation parameters and/or the current first and second weightings unchanged. The foresaid look-up table, the calculation operation and the maintenance of parameters and/or weightings can be properly combined for utilization. In an embodiment, if x and y represent the current first and second relocation parameters respectively or represent the current first and second weightings respectively, providing the other setting is kept unchanged, the control device 100 of FIG. 1C or FIG. 1D is operable to update the first and second relocation parameters or update the first and second weightings to be $x\cdot f(T)$ and $y\cdot g(T)$ according to a thermal detection result T. An example of the correlation between f(T) and the thermal detection result T and the correlation between g(T) and the thermal detection result T is illustrated by Table 1 below. However, this example is not a limitation to the scope of the present disclosure, which means that those of ordinary skill in the art can derive other examples from the disclosure of this specification in light of their needs.

TABLE 1

|  | f(T) | g(T) |
| --- | --- | --- |
| T lower than 20° C. | 0.5 | 0.5 |
| T = 20° C.~30° C. | 1 | 1 |
| T = 31° C.~50° C. | 1.5 | 1.5 |
| T = 51° C.~80° C. | 2 | 2 |
| T = 81° C.~100° C. | 4 | 4 |
| T higher than 100° C. | 5 | 5 |

Figure 2:
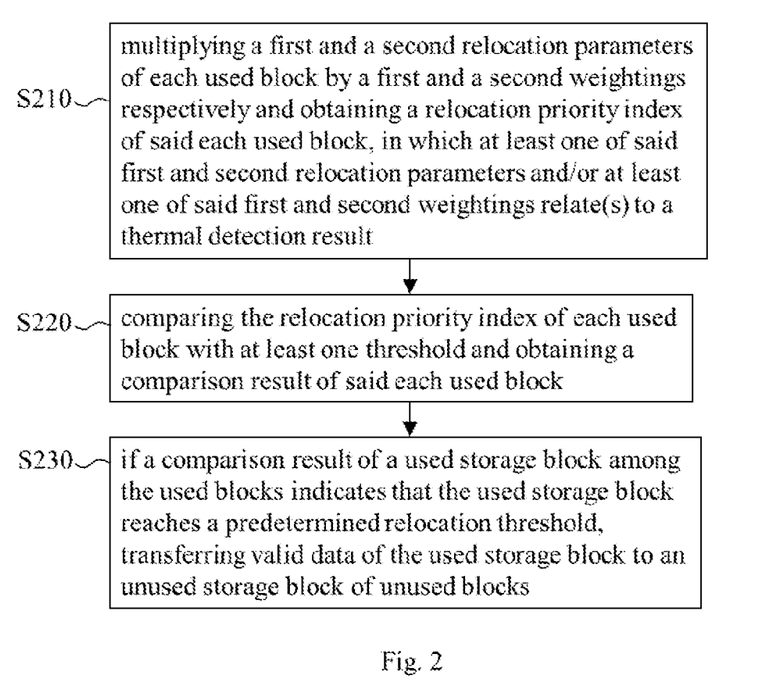
FIG. 2 illustrates an embodiment of the weighting-type data relocation control method of the present disclosure.

In addition to the fore-disclosed control device 100, the present disclosure further provides a weighting-type data relocation control method that is carried out by the control device 100 or the equivalent thereof. The control method can similarly control data relocation of a non-volatile memory which includes a plurality of used blocks and a plurality of unused blocks, in which each used block is associated with a first relocation parameter and a second relocation parameter. An embodiment of the control method is illustrated in FIG. 2 and includes the following steps:

Step S210: multiplying the first relocation parameter and the second relocation parameter of each of the used blocks by a first weighting and a second weighting respectively and thereby obtaining a relocation priority index of said each of the used blocks, in which at least one of said first and second relocation parameters and/or at least one of said first and second weightings relate(s) to a thermal detection result;

Step S220: comparing the relocation priority index of each of the used blocks with at least one threshold and thereby obtaining a comparison result of said each of the used blocks; and Step S230: if a comparison result of a used storage block among the used blocks indicates that the used storage block reaches a predetermined relocation threshold, transferring valid data of the used storage block to an unused storage block of the unused blocks.

Since those of ordinary skill in the art can appreciate the detail and modification of the method embodiment by referring to the description of the fore-disclosed device embodiments, which means that the features of the device embodiments can be applied to the method embodiment in an reasonable way, repeated and redundant description is therefore omitted provided that the written description and enablement requirements are still fulfilled.

In summary, the present disclosure comprehensively takes a plurality of relocation parameters into consideration to adaptively assign said relocation parameters appropriate weightings, so that the performance of data relocation is improved and the service life of a non-volatile memory is extended.

The aforementioned descriptions represent merely the exemplary embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A weighting-type data relocation control device, configured to control data relocation of a non-volatile memory, in which the non-volatile memory includes used blocks and unused blocks, each of the used blocks is associated with a first relocation parameter and a second relocation parameter, and the weighting-type data relocation control device comprises:
   a storage controller configured to carry out at least the following steps for controlling the data relocation of the non-volatile memory:
      multiplying the first relocation parameter and the second relocation parameter by a first weighting and a second weighting respectively and thereby obtaining a relocation priority index, in which at least one of said first and second relocation parameters and/or at least one of said first and second weightings relate(s) to a thermal detection result;
      comparing the relocation priority index with at least one threshold and thereby obtaining a comparison result; and
      if the comparison result corresponding to a used storage block of the used blocks indicates that the used storage block reaches a predetermined relocation threshold, transferring valid data of the used storage block to an unused storage block of the unused blocks,
      wherein the first relocation parameter is a count of invalid data, and the second relocation parameter is a ranking of storage time.

2. The weighting-type data relocation control device of claim 1, wherein the storage controller adjusts the first and second weightings according to an estimated service life of the non-volatile memory.

3. The weighting-type data relocation control device of claim 2, wherein the storage controller measures the estimated service life of the non-volatile memory according to an erase number, and the increase of the erase number indicates the decrease of the estimated service life of the non-volatile memory.

4. The weighting-type data relocation control device of claim 1, wherein the storage controller reduces the first weighting and increases the second weighting in response to the decrease of the estimated service life of the non-volatile memory.

5. The weighting-type data relocation control device of claim 1, wherein the storage controller adjusts the first and second weightings according to an estimated service life of the non-volatile memory.

6. A weighting-type data relocation control device, configured to control data relocation of a non-volatile memory, in which the non-volatile memory includes used blocks and unused blocks, each of the used blocks is associated with a first relocation parameter and a second relocation parameter, and the weighting-type data relocation control device comprises:
   a storage controller configured to carry out at least the following steps for controlling the data relocation of the non-volatile memory:
      multiplying the first relocation parameter and the second relocation parameter by a first weighting and a second weighting respectively and thereby obtaining a relocation priority index, in which at least one of said first and second relocation parameters and/or at least one of said first and second weightings relate(s) to a thermal detection result;
      comparing the relocation priority index with at least one threshold and thereby obtaining a comparison result; and
      if the comparison result corresponding to a used storage block of the used blocks indicates that the used storage block reaches a predetermined relocation threshold, transferring valid data of the used storage block to an unused storage block of the unused blocks,
      wherein the storage controller adjusts the first and second weightings according to an estimated service life of the non-volatile memory, and the storage controller reduces the first weighting and increases the second weighting in response to the decrease of the estimated service life of the non-volatile memory.

7. The weighting-type data relocation control device of claim 1, wherein the weighting-type data relocation control device is applied to a solid state drive (SSD).

8. The weighting-type data relocation control device of claim 1, wherein the storage controller further carries out the following steps: erasing the valid data of the used storage block; and treating the unused storage block as a new used block.

9. The weighting-type data relocation control device of claim 1, wherein the at least one threshold includes a relocation value, and if the relocation priority index of the used storage block reaches the relocation value, the storage controller determines that the comparison result of the used storage block indicates the used storage block reaching the predetermined relocation threshold.

10. The weighting-type data relocation control device of claim 1, wherein the at least one threshold includes a first threshold and a second threshold; if the relocation priority index of one of the used blocks reaches the first threshold, the storage controller assigns the one of the used blocks a first relocation priority; if the relocation priority index of the one of the used blocks is between the first threshold and the second threshold, the storage controller assigns the one of the used blocks a second relocation priority, in which the second relocation priority is lower than the first relocation priority; and if the relocation priority index of the one of the used blocks fails to reach the second threshold, the storage controller assigns the one of the used blocks a third relocation priority, in which the third relocation priority is lower than the second relocation priority.

11. The weighting-type data relocation control device of claim 1, wherein the step of obtaining the relocation priority index comprises: multiplying the first relocation parameter by the first weighting to obtain a first reference value; multiplying the second relocation parameter by the second weighting to obtain a second reference value; and summing the first and second reference values up to obtain the relocation priority index, or summing the first and second reference values up in accordance with a weighted manner to obtain the relocation priority index.

12. A weighting-type data relocation control method executed by a storage controller, configured to control data relocation of a non-volatile memory, in which the non-volatile memory includes used blocks and unused blocks, each of the used blocks is associated with a first relocation parameter and a second relocation parameter, and the weighting-type data relocation control method comprises the following steps:
multiplying the first relocation parameter and the second relocation parameter by a first weighting and a second weighting respectively and thereby obtaining a relocation priority index, in which at least one of said first and second relocation parameters and/or at least one of said first and second weightings relate(s) to a thermal detection result;
comparing the relocation priority index with at least one threshold and thereby obtaining a comparison result; and
if the comparison result corresponding to a used storage block of the used blocks indicates that the used storage block reaches a predetermined relocation threshold, transferring valid data of the used storage block to an unused storage block of the unused blocks,
wherein the at least one threshold includes a first threshold and a second threshold; if the relocation priority index of one of the used blocks reaches the first threshold, the storage controller assigns the one of the used blocks a first relocation priority; if the relocation priority index of the one of the used blocks is between the first threshold and the second threshold, the storage controller assigns the one of the used blocks a second relocation priority, in which the second relocation priority is lower than the first relocation priority; and if the relocation priority index of the one of the used blocks fails to reach the second threshold, the storage controller assigns the one of the used blocks a third relocation priority, in which the third relocation priority is lower than the second relocation priority.

13. The method of claim 12, wherein the first relocation parameter is a count of invalid data and the second relocation parameter is a ranking of storage time.

14. The method of claim 13, further comprising: adjusting the first and second weightings according to an estimated service life of the non-volatile memory.

15. The method of claim 14, further comprising: measuring the estimated service life of the non-volatile memory according to an erase number, in which the increase of the erase number indicates the decrease of the estimated service life of the non-volatile memory.

16. The method of claim 13, further comprising: reducing the first weighting and increasing the second weighting in response to the decrease of the estimated service life of the non-volatile memory.

17. The method of claim 12, wherein the method is applied to a solid state drive (SSD).

18. The method of claim 12, wherein the step of obtaining the relocation priority index comprises: multiplying the first relocation parameter by the first weighting to obtain a first reference value; multiplying the second relocation parameter by the second weighting to obtain a second reference value; and summing the first and second reference values up to obtain the relocation priority index, or summing the first and second reference values up in accordance with a weighted manner to obtain the relocation priority index.

19. The weighting-type data relocation control device of claim 6, wherein the storage controller further carries out the following steps: erasing the valid data of the used storage block; and treating the unused storage block as a new used block.

20. The weighting-type data relocation control device of claim 6, wherein the at least one threshold includes a relocation value, and if the relocation priority index of the used storage block reaches the relocation value, the storage controller determines that the comparison result of the used storage block indicates the used storage block reaching the predetermined relocation threshold.

* * * * *